US005233198A

United States Patent [19]

Changaris

[11] Patent Number: 5,233,198

[45] Date of Patent: Aug. 3, 1993

[54] MECHANICAL APPARATUS TO ENSURE THAT ONLY PULSES OF RADIATION ARE RADIATED IN ANY SPECIFIC DIRECTION

[76] Inventor: David G. Changaris, 1132 Rostrevor Cir., Louisville, Ky. 40205

[21] Appl. No.: 819,481

[22] Filed: Jan. 10, 1992

[51] Int. Cl.[5] .............................................. G01J 1/00

[52] U.S. Cl. ............................ 250/504 R; 250/493.1; 250/494.1

[58] Field of Search ............... 250/493.1, 494.1, 503.1, 250/504 R; 362/281, 283

[56] References Cited

U.S. PATENT DOCUMENTS

| | | | |
|---|---|---|---|
| 1,115,103 | 10/1914 | Pierce | 362/281 |
| 2,347,672 | 5/1944 | Dircksen et al. | 250/504 R |
| 2,365,342 | 9/1944 | Hilliard et al. | 250/504 R |
| 2,567,403 | 9/1951 | Rockola | 362/281 |
| 2,761,959 | 9/1956 | Kumins | 362/281 |
| 2,943,185 | 6/1960 | DeMott | 362/281 |
| 3,733,709 | 5/1973 | Bassemir | 250/504 R |
| 3,990,787 | 11/1976 | Modert | 350/275 |
| 4,575,786 | 3/1986 | Roberts | 362/283 |

*Primary Examiner*—Bruce C. Anderson
*Attorney, Agent, or Firm*—James R. Higgins, Jr.

[57] ABSTRACT

This invention is for a mechanical apparatus which ensures that only pulses of radiation are radiated in any specific direction and a method to effect same. In the most general terms, this apparatus comprises a partway closed three-dimensional geometric surface having some thickness, but being hollow inside the partway closed portion and having at least one opening through the surface. The surface is shaped so that a desired radiation source can be placed into the hollow portion inside the surface's partway closed portion. The surface is further shaped so that radiation from the desired radiation source can pass from the hollow inside the surface's partway closed portion through the at least one opening through the surface thereby forming a radiation beam. The surface is constructed of material(s) which the wavelength(s) of the radiation from the desired radiation source will not pass through the surface. An axis for the at least partway closed surface is defined which does not intersect the at least one opening through the surface. By rotating the surface about this axis, the radiation beam revolves in space. At any specific location which the radiation beam intersects, a radiation pulse will be sensed. Other surfaces can be employed with the at least partway closed surface to further restrict the radiation pattern of the radiation beam. The surfaces can be rotated by motor or by air turbine means.

11 Claims, 7 Drawing Sheets

200
240
3a
3a
260
12

MECHANICAL APPARATUS TO ENSURE THAT ONLY PULSES OF RADIATION ARE RADIATED IN ANY SPECIFIC DIRECTION

BACKGROUND OF THE INVENTION (a) Field of the Invention

This invention is for a mechanical apparatus which ensures that only pulses of radiation are radiated in any specific direction and a method to effect same. In the most general terms, this apparatus comprises a partway closed three-dimensional geometric surface having some thickness, but being hollow inside the partway closed portion and having at least one opening through the surface. The surface is shaped so that a desired radiation source can be placed into the hollow portion inside the surface's partway closed portion. The surface is further shaped so that radiation from the desired radiation source can pass from the hollow inside the surface's partway closed portion through the at least one opening through the surface thereby forming a radiation beam. The surface is constructed of material(s) which the wavelength(s) of the radiation from the desired radiation source will not pass through the surface. An axis for the at least partway closed surface is defined which does not intersect the at least one opening through the surface. By rotating the surface about this axis, the radiation beam revolves in space. At any specific location which the radiation beam intersects, a radiation pulse will be sensed. Other surfaces can be employed with the at least partway closed surface to further restrict the radiation pattern of the radiation beam.

(b) Description of the Prior Art

Pulses of electromagnetic radiation can be provided by various mechanical or electrical means. Depending on the frequency range of the electromagnetic radiation desired, for example, radio-frequency, microwave, infrared, visible light, ultraviolet, x-rays, and gamma-rays, different types of radiation source devices are used. These devices have various shapes and sizes and may produce omnidirectional radiation beams or directed radiation beams. Further, the radiation generated may be continuous or pulsed. The purpose of the present invention is to ensure that no matter the type of radiation source employed, only radiation pulses can be sensed at any specific point distant from the radiation source. The prior art of interest relates to apparatuses and methods which mechanically ensure that there is time when a radiation beam cannot be transmitted in a specific direction and which radiate continuously but could be improved by only radiating discrete pulses.

In my co-pending U.S. patent application Ser. No. 07/675,689, filed Mar. 27, 1991, for a Method of Inducing Tanning or DNA Repair by Pulsed Light and Apparatus to Effect Same, I disclosed a mechanically-pulsed irradiation generation apparatus which employs an ultraviolet (uv) A (320–390 nanometer (nm)) or a uv B (286–320 nm) light source and at least one rotating cylinder having slits which allowed a discrete pulse of light to pass therethrough when in proper alignment. Depending on the wavelength(s) selected, the pulses of uv light are used in tanning and deoxyribonucleic acid (DNA) repair.

In that application, I teach that exposure to continuous uv A and uv B light sources can produce a series of potentially toxic results, for example, a rapid destruction of genetic (thymine dimer formation) and protein structure through the build up of cellular toxins. Sun burn, corneal clouding, and retinal damage are the short term side effects, while premature skin aging and accelerated cancer, such as melanoma, are the long term side effects. I further teach that by using pulsed light, tanning can occur, but with significantly reduced side effects. By exposing the skin to a uv pulse of duration "x" and then having an unexposed or dark period "z", we have a cycle "q" which is expressed as "$x+z=q$". Pulses having a duration x on the order of picoseconds to milliseconds produce an irradiation cycle which will prevent the buildup of the toxic products which accumulate during continuous uv exposure, because of the body's response during the dark period z.

I further teach in that application placing at least one cylinder having a slit therethrough adjacent to a light source. If the cylinder is rotated, light will only pass through the cylinder slit when the slit is in alignment with the radiated light, thereby creating a pulse. However, experience has shown that placement results in the majority of the light being wasted, as the uv light source therein employed is tubular-shaped and radiates light circumferentially omnidirectional and the slits pass only that amount of light radiated toward them.

It is also well known in the art that uv C (40–286 nm) light, and more specifically 254 nm light, is extremely effective in killing bacteria, and many patents have been issued for apparatus and methods to kill bacteria. For example, U.S. Pat. No. 4,786,812, to Humphreys, teaches a portable germicidal ultraviolet lamp; U.S. Pat. No. 2,654,021, to Bartholomew, teaches an assembly having fluorescent lamps, a uv sun lamp, and uv germ-killing lamps; and, U.S. Pat. No. 3,107,974, to Potapenko, teaches a method and system for the prevention of the spread of infectious disease by airborne microorganisms. Humphreys and others teach that there is a danger to humans through exposure to continuous uv 254 nm light. Humphreys particularly teaches that prolonged or intense exposure can cause reddening of the skin or irritation of the eyes. We often refer to uv C inflammation as "snow blindness" and this inflammation often lasts a few days. As an example, to prevent these dangers, the patents I have reviewed either teach trying to shield the uv light source from sight, or, as in U.S. Pat. No. 2,350,665, to Alexander, for a method for germicidal treatment of air-borne bacteria, teach focusing a uv beam in a plane out of human sight, such as at knee level or near ceiling level.

SUMMARY OF THE INVENTION

I have previously taught that using pulsed uv radiation to cause tanning and to promote DNA repair has advantages over continuous exposure. Further, I believe that there are many other instances where continuous electromagnetic radiation is currently being applied to cause a desired effect, such as using continuous 254 nm uv C light to kill bacteria, where my present invention could be incorporated to ensure that only pulses would be radiated in any direction.

My invention has particular benefit when combined with devices which transmit radiation which can come into contact with a person's exposed skin or eyes. Through various adjustments of the device, such as, for example, changing the power per unit area radiated, the same desired effect can be accomplished with added safety for humans who come into contact with the pulsed instead of continuous radiation. As an example, I now believe that it is almost impossible to damage eyes with a 10 millisecond pulse of uv B or C radiation having an energy per unit area of 10 microjoules per square centimeter. By pulsing, which provides a dark period between each pulse, I believe that a human can be exposed to more cumulative energy per unit area than with continuous radiation before any of the previously mentioned side effects occur.

The dark period is not only beneficial to humans, it is beneficial to anything having pigment. For example, small color transparencies are illuminated with visible light in a slide projector apparatus. Also, large translucent color photographs are often placed in boxes having a visible back light. In both of these situations, with prolonged exposure, there will be color fading, as the color pigments degrade when exposed to continuous light. By using the mechanical shutter of my instant invention and providing pulses of light, rather than continuous light, with an appropriate relationship between the dark period and light period and with an appropriate rate of rotation of the mechanical shutter so that to the human eye the light appears continuous, the color fading will be slowed. Also, by providing reflecting surfaces or surfaces with geometric shapes to focus the light, the light power can be reduced.

I have now invented a much more efficient mechanical apparatus and method to ensure that only pulsed radiation is radiated in any specific direction. This is accomplished by employing at least a partway closed three-dimensional geometric surface having thickness which is hollow inside the partway closed portion and by placing the desired radiation source into the hollow portion. The geometric surface has at least one opening through it. The opening is shaped to permit the desired radiation beam pattern to transit the opening. The geometric surface has an axis of rotation which does not intersect the opening in the geometric surface. The axis of rotation is located so that as the geometric surface is rotated about the axis, the radiation beam pattern transiting the opening in the geometric surface will follow a desired path. Therefore, at a stationary point in the beam's path, the radiation beam will provide a pulse of radiation. The rate of rotation and the geometric relationship between the surface dimensions and the opening will determine whether a human eye perceives this radiation as a pulse or as continuous, if visible. At least one other surface with at least one opening can be incorporated inside or outside the first geometric surface to further restrict the radiation beam pattern. I believe that the mechanical apparatus of my present invention will provide the same effect that an electrical apparatus could produce, but with less complexity and expense.

While my invention can be used with any radiation source, I am selecting a tube-shaped uv radiator to further explain the functioning of my invention. Therefore, I will use a hollow cylinder as the shape for the three-dimensional geometric surface employed. However, those skilled in the art can envision how other surfaces will be employed for different radiators.

More particularly, when employed with a tube-shaped uv radiator, the present invention comprises an apparatus to provide pulses of uv light wherein a rotatable cylinder having at least one opening in its cylindrical surface is placed around a uv light source. Depending upon the size of the at least one opening, as the cylinder is rotated, light is transmitted from the uv light source out the at least one opening, thereby appearing as a pulse at a fixed location outside the cylinder.

Even more particularly, the present invention is a mechanical apparatus to ensure that only pulses of radiation are radiated in any specific direction, the apparatus comprising: a radiation source producing radiation; a first partway closed three-dimensional geometric surface having thickness, said surface having a hollow portion inside its partway closed portion, said surface having at least one opening therethrough, said surface having an axis which does not intersect said at least one opening, said surface being shaped so that said radiation source can be placed inside said hollow portion inside said surface's partway closed portion, said surface being further shaped so that said radiation from said radiation source can pass from said hollow portion through said at least one opening through said surface, thereby forming a radiation beam; and, means to axially rotate said first partway closed three-dimensional geometric surface.

Further, the present invention is for a method to ensure that only pulses of radiation are radiated in any specific direction, the method comprising the steps of: placing a radiation source producing radiation inside a hollow portion of a first partway closed three-dimensional geometric surface having thickness and an axis; rotating said first partway closed three-dimensional geometric surface about said axis; and, passing said radiation produced by said radiation source through at least one opening through said surface, wherein said axis does not intersect said at least one opening, thereby causing a radiation pulse to be sensed at a point distant from said first partway closed three-dimensional geometric surface when said point distant, said at least one opening, and said radiation source are in radiation communication.

Finally, it should be apparent that if a plurality of radiation sources is employed, a suitable plurality of apparatus of the present invention could also be employed to provide a plurality of synchronized or unsynchronized pulses, as desired.

BRIEF DESCRIPTION OF THE DRAWINGS

A better understanding of the present invention will be had upon reference to the following description in conjunction with the accompanying drawings, wherein.

DETAILED DESCRIPTION OF THE PREFERRED EMBODIMENT

Figure 1:
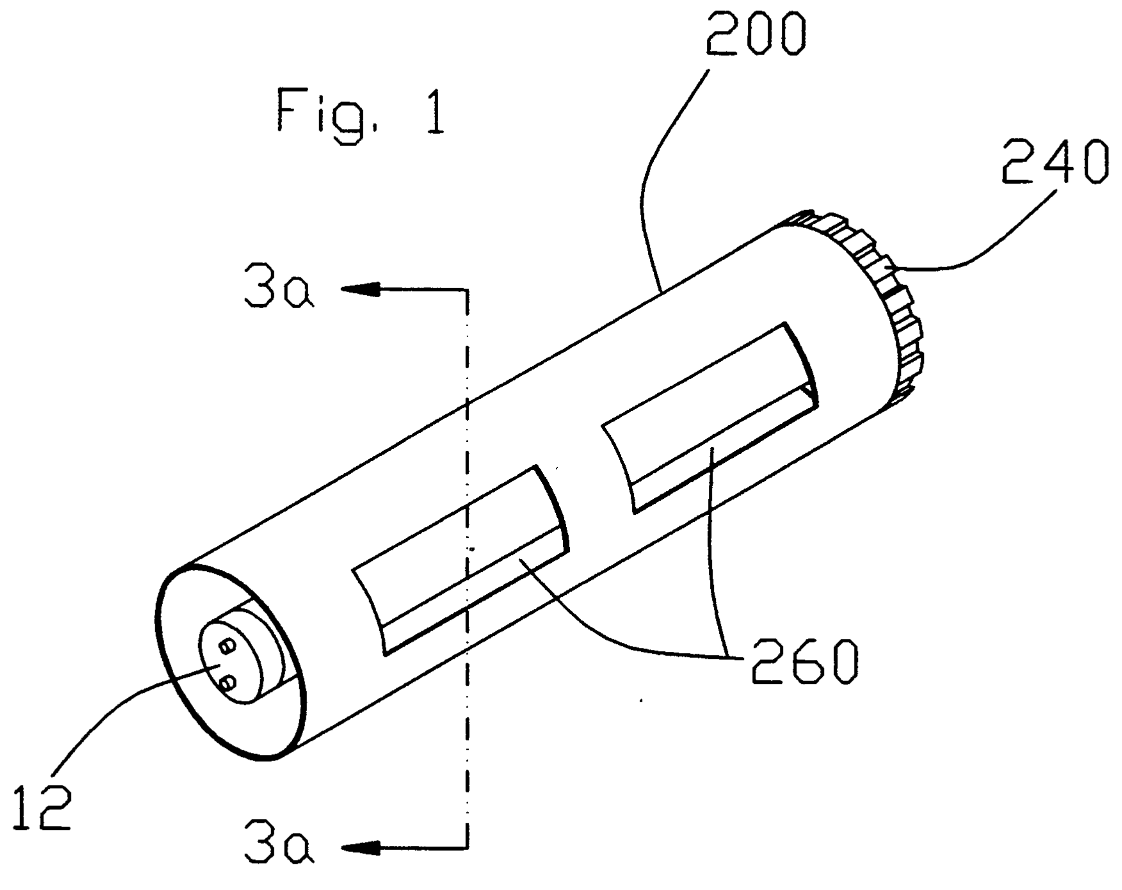
FIG. 1 shows a perspective view of a tube-shaped radiation source inside a hollow cylinder having openings therethrough of one embodiment of the present invention.
Figure 2:
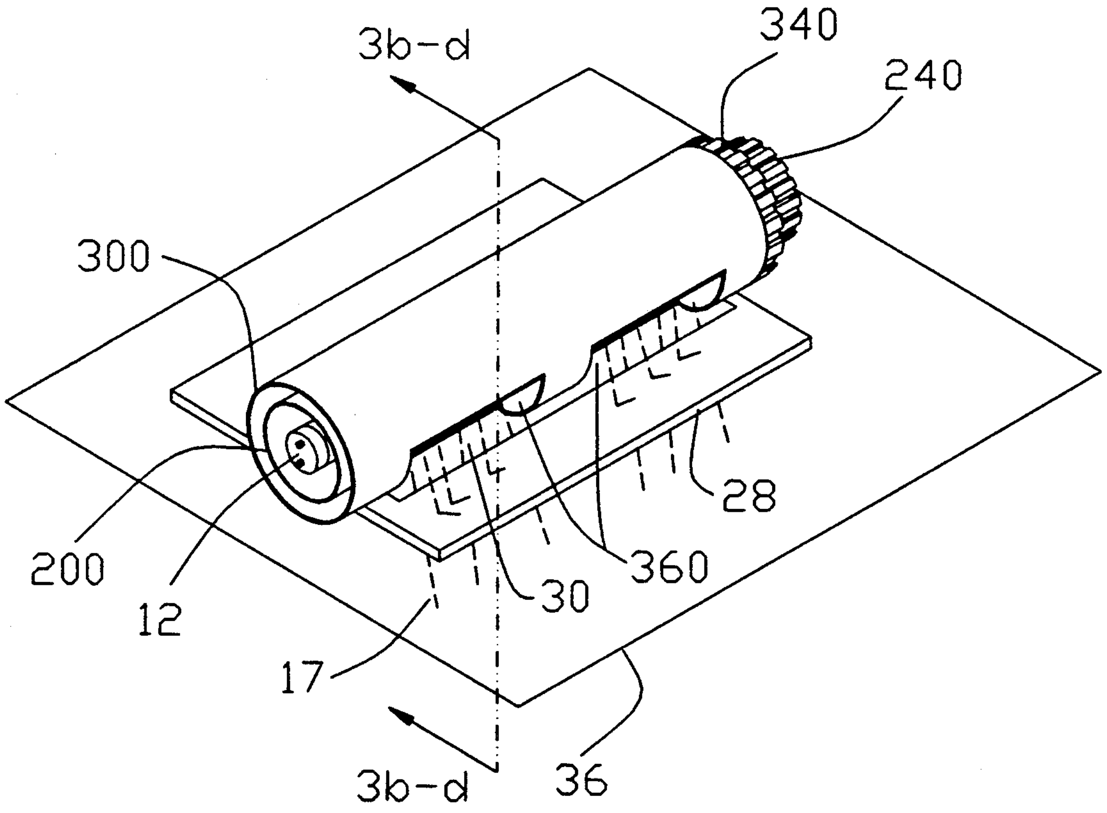
FIG. 2 shows a perspective view of a tube-shaped radiation source inside a pair of hollow cylinders having openings therethrough of another embodiment of the present invention.

The figures show different embodiments of the present invention. FIG. 1 shows an circumferentially omnidirectional radiation source inside one hollow cylinder having openings therethrough of one embodiment of the present invention. FIG. 2 shows an circumferentially omnidirectional radiation source inside a pair of hollow cylinders having openings therethrough of another embodiment of the present invention. FIG. 3 shows selected radiation patterns for the apparatuses shown in FIGS. 1 and 2. FIG. 4 shows a top and bottom view of one embodiment of the present invention incorporating a plurality of radiation sources, each inside one hollow cylinder. FIG. 5 shows one means to axially rotate a plurality of single cylinders and another means to axially rotate a plurality of inner and outer cylinders in opposite directions which could be used with the present invention. FIG. 6 shows how fins could be added to a cylinder to utilize air turbine technology to rotate the cylinder. FIG. 7 shows a more general embodiment of the present invention. For tanning and DNA repair, I believe that the inner and outer cylinder embodiment, such as shown in FIG. 2, is preferable, as it is desirable to only radiate pulses in the direction desired.

With reference now to FIG. 1, a tube-shaped radiation source 12 is shown inside a first hollow cylinder 200 having two openings 260 in the cylindrical surface. As will be explained later, sprockets 240 located at one end of cylinder 200 will be used to rotate cylinder 200 about its axis. In FIG. 2, the tube-shaped radiation source 12 and the first hollow cylinder 200 have been inserted into a second hollow cylinder 300. First cylinder 200 and second cylinder 300 are in coaxial alignment. The second cylinder 300 also has two openings 360 in its cylindrical surface. As shown in FIG. 2, first hollow cylinder 200 has an axial length greater than that of second hollow 10 cylinder 300. The end of cylinder 200 having sprockets 240 extends axially outside the end of cylinder 300 having sprockets 340. As will be explained later, sprockets 240 and 340 will be used to rotate cylinders 200 and 300 about their common axis. By rotating cylinder 200 in one direction about its axis and cylinder 300 in the opposite direction about its axis, a pulse of shorter duration "x" is produced than if only one of the cylinders is rotated or if both of the cylinders are rotated at the same speed in the same direction.

FIG. 2 also includes filter block or surface 28 having a slot or opening 30 therethrough. When radiation source 12, openings 260 in first cylinder 200, openings 360 in second cylinder 300, and opening 30 are in radiation communication, radiation from radiation source 12 passes therethrough. When one or both of first 200 and second 300 cylinders rotate, the alignment of openings 260, 360, and 30 is such that radiation passing through opening 30 from radiation source 12 toward surface 36 is in the form of a radiation pulse 17.

Figure 3A:
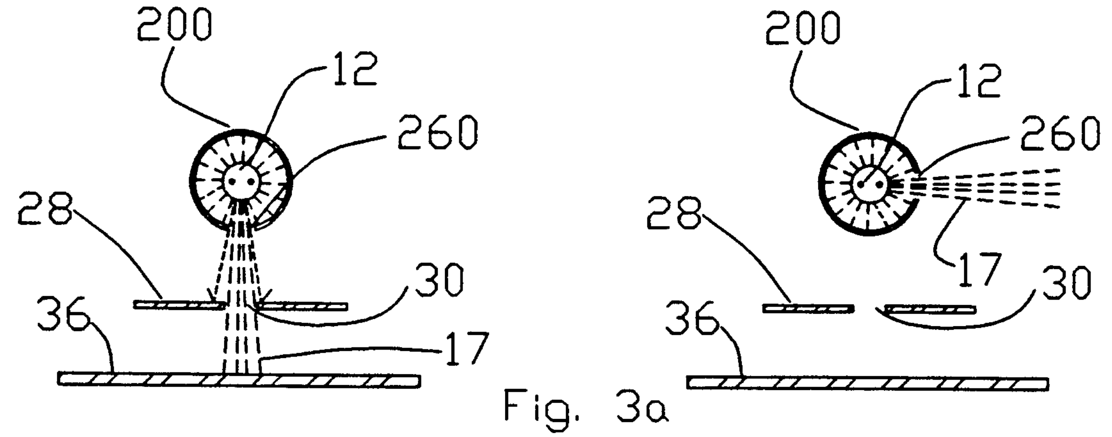
FIG. 3*a–d* shows selected radiation patterns for the apparatuses shown in FIGS. 1 and 2.

FIG. 3*a* shows a two-dimensional cross-section along the lines 3*a* of FIG. 1, with the addition of surface 28 having opening 30, surface 36, and radiation beam 17. With radiation source 12 continuously circumferentially radiating omnidirectionally, the rotation of cylinder 200 causes a "lighthouse effect." Radiation 17 passing through opening 260 will rotate around the axis of cylinder 200 causing a pulse of radiation to pass through opening 30 and irradiate a fixed location on surface 36 for each rotation of cylinder 200. However, for example, because of the rate of revolution which will be used for tanning, a human eye would not detect this "lighthouse effect", but, instead, would sense continuous radiation, as the uv light is visible.

Increasing the reflectivity of the inner cylindrical surface of cylinder 200 for the wavelength(s) of radiation 17 being radiated by omnidirectional radiation source 12 will cause more power per unit area to irradiate the fixed location on surface 36. In contrast, radiation source 12 can be constructed so that it only radiates in the direction of the fixed location on surface 36 to be pulsed. There will then be no "lighthouse effect". Instead, rotating cylinder 200 will cause pulses of radiation to appear at the fixed location on surface 36 by having the inner cylindrical surface of cylinder 200 interrupt the radiation 17 radiating toward that fixed location. With this directional radiation source 12, the inner cylindrical surface of cylinder 200 may be made more absorptive to the wavelength(s) of radiation 17 to decrease undesired reflections.

Figure 3B:
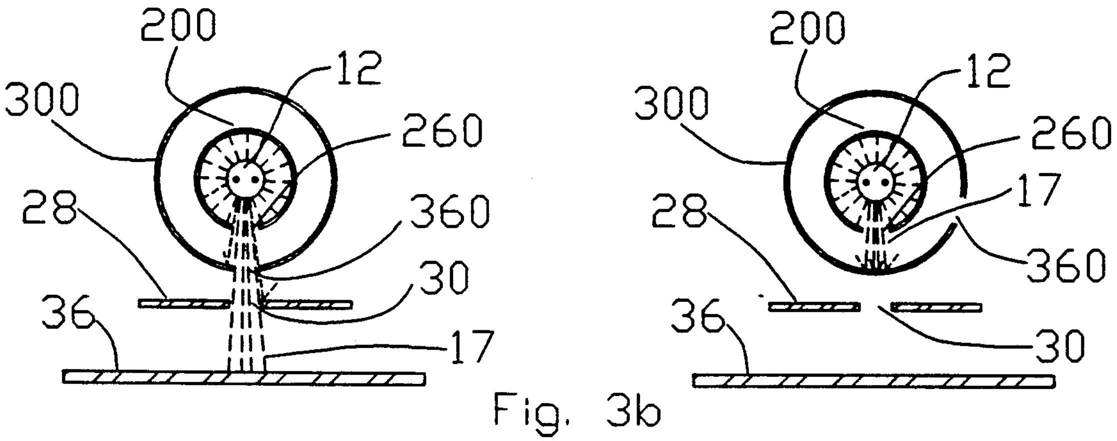
Figure 3C:
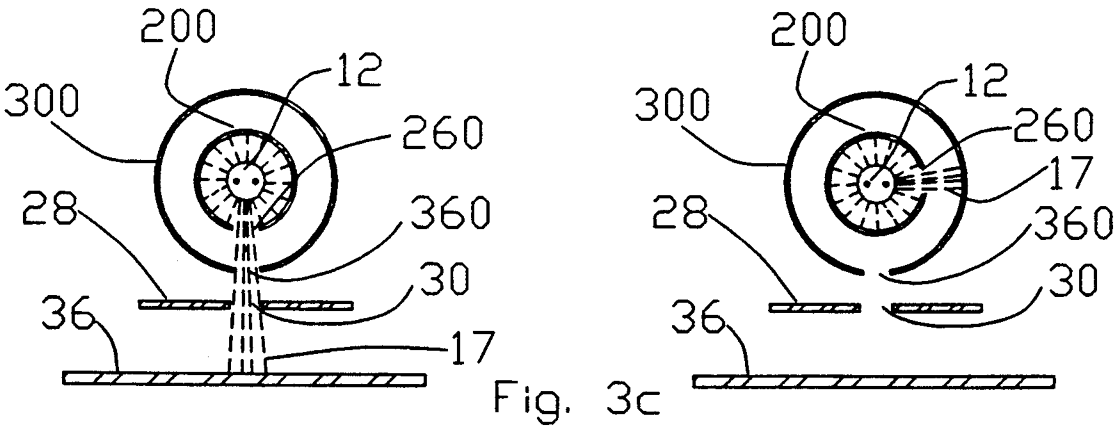
Figure 3D:
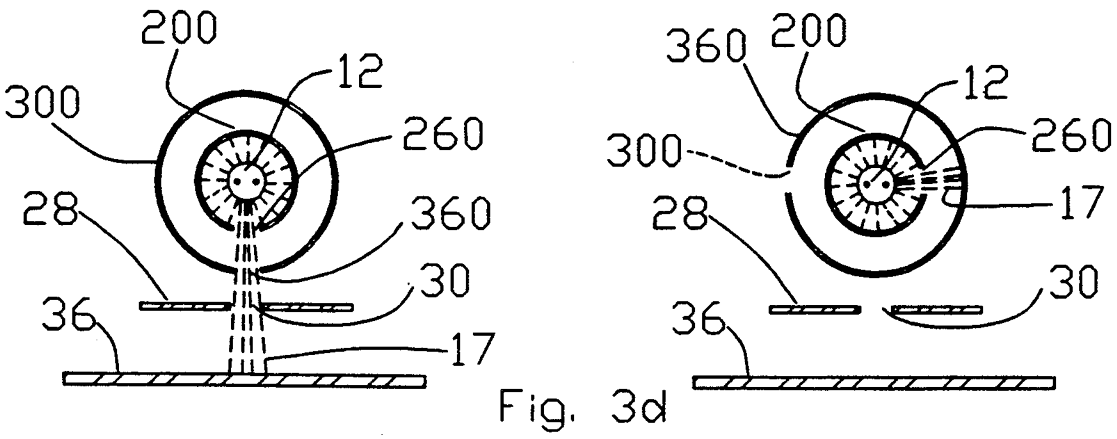

FIGS. 3*b–d* show two-dimensional cross-section views along the lines 3*b–d* of FIG. 2. FIGS. 3*b–d* all show an circumferential omnidirectional radiation source 12, a first cylinder 200 having opening 260, a second cylinder 300 having opening 360, a surface 28 having opening 30, a surface 36, and a radiation beam 17. In FIG. 3*b*, first cylinder 200 is stationary and second cylinder 300 rotates. In FIG. 3*c*, first cylinder 200 rotates and second cylinder 300 is stationary. In FIG. 3*d*, first cylinder 200 and second cylinder 300 rotate at the same number of revolutions per unit time, but in opposite directions. In all three of these configurations, one pulse 17 irradiates a location on surface 36 each time radiation source 12 and openings 260, 360, and 30 are in radiation communication. The rotational speed of the rotating one or both cylinders will determine the period "q". The geometric relationships between the size of the various openings and the cylinder dimensions, along with rotational speed will determine the length of time "x" when there is a pulse at surface 36. During the dark period "z" there is no pulse at surface 36. Therefore, as was disclosed in my parent application, "x+z=q". For example, I envision that in tanning, the dark period will be at least three times longer than the pulse period. However, depending on the application and exposure desired, this relationship will vary greatly.

As was discussed with FIG. 3*a*, increasing the reflectivity of the inner cylindrical surface of first cylinder 200 for the wavelength(s) of radiation 17 being radiated by circumferential omnidirectional radiation source 12 will cause more power per unit area to irradiate the location on surface 36. Further, depending on the geometry, it may be desirable for the inner cylindrical surface of first cylinder 200 to have parabolic shape to geometrically focus radiation 17 through opening 260.

Because the only time a pulse is desired is when radiation source 12 and openings 260, 360, and 30 are in radiation communication, the outer cylindrical surface of first cylinder 200 and both the inner and outer cylindrical surfaces of second cylinder 300 can be made absorptive to the wavelength(s) of radiation 17 being radiated by radiation source 12. Again, as was discussed with the single cylinder configuration of FIG. 3*a*, radiation source 12 can be constructed so that it only radiates in the direction where radiation source 12 and openings 260, 360, and 30 are in radiation communication.

Figure 4A:
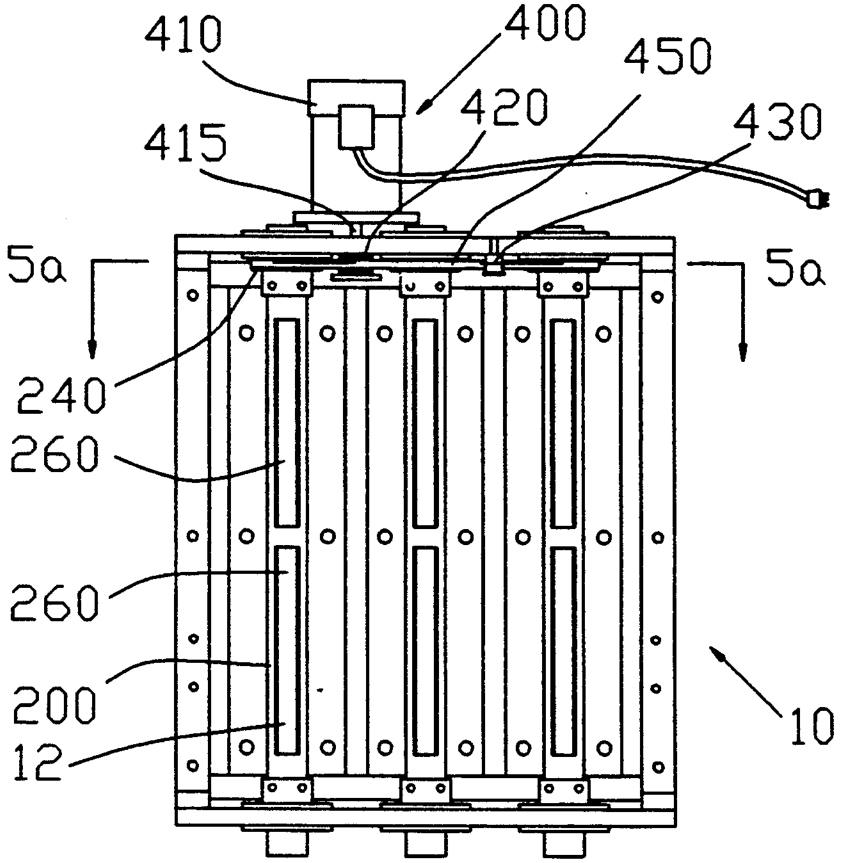
FIG. 4*a–b* shows a top and bottom view of one embodiment of the present invention incorporating a plurality of radiation sources.

FIG. 4a is a top view of an apparatus 10 to provide pulses of radiation. In operation, the top of apparatus 10 would have a protective cover installed. Apparatus 10 has three radiation sources 12 each contained in a hollow cylinder 200. Each cylinder 200 has two openings 260 through the cylindrical surface of cylinder 200. As shown, the two openings 260 in each cylinder 200 have a combined length which approximates the length of the radiation source 12 inside the cylinder 200. The openings 260 each have a width which approximates the diameter of the radiation source 12 inside the cylinder 200. Also, all openings 260 in all cylinders 200 are aligned in parallel, for example, all openings 260 are shown facing up. The three cylinders are shown spaced equally apart and parallel to each other. This spacing will be determined by how far away surface 36 to be irradiated by a pulse, shown in previous figures, is from apparatus 10 and the desired irradiation pattern on surface 36. For example, for tanning and DNA repair, uniform power per unit area irradiation distribution is desired.

Figure 4B:
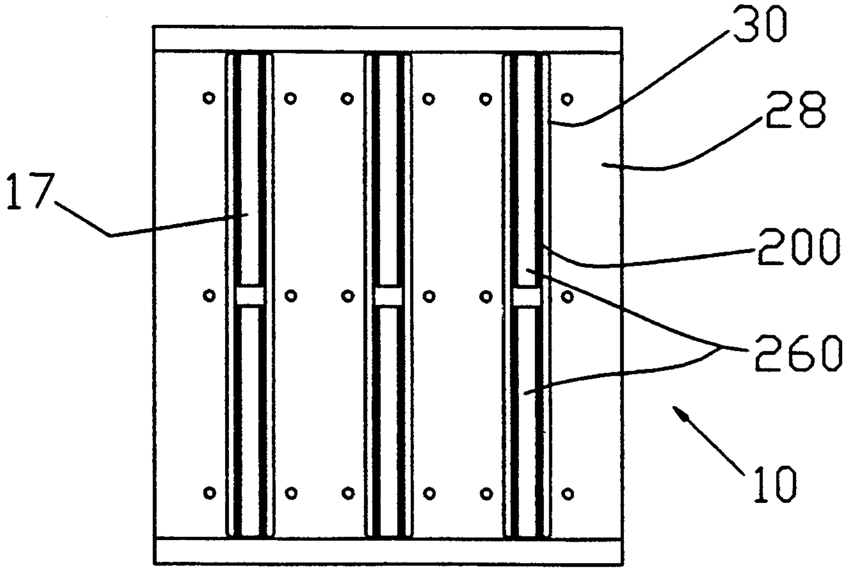

FIG. 4b shows a bottom view of apparatus 10 of FIG. 4a with cylinders 200 having been rotated 180 degrees from the position shown in FIG. 4a so that openings 260 now all face the bottom of apparatus 10. At the instant shown in FIG. 4b, a pulse of radiation 17 would be simultaneously transmitted from each radiation source 12 through openings 260 in each cylinder 200 and further through openings 30 in surface 28.

Figure 5A:
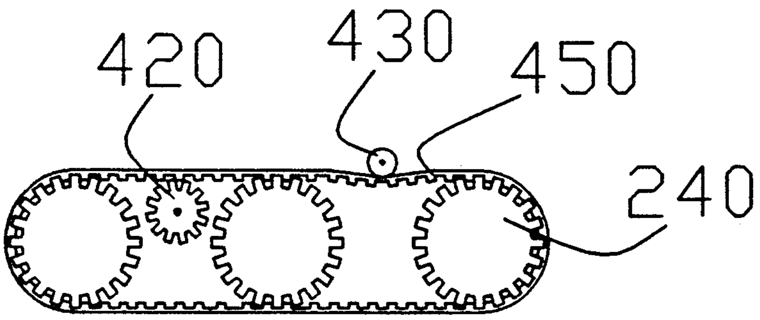
FIG. 5*a–b* shows one means to axially rotate a plurality of single cylinders and another means to axially rotate a plurality of inner and outer cylinders in opposite directions, both means employing a motor, which could be used with the present invention.

FIG. 4a also shows one typical rotation means 400. FIG. 5a shows a side view of means 400 along the lines 5a shown in FIG. 4a. With reference to both FIG. 4a and 5a, sprockets 240 at one end of each cylinder 200 are aligned in a plane. Means 400 is shown comprising a motor 410 having a shaft 415 connected to a sprocketed gear drive 420. A sprocketed endless conveyor 450 engages the appropriate sprockets 240 of each cylinder 200 and sprocketed gear drive 420. Conveyor tension means 430 maintains proper tension on sprocketed endless conveyor 450. As motor 410 rotates shaft 415 and thereby rotates sprocketed gear drive 420, sprocketed endless conveyor 450 rotates, thereby rotating cylinders 200.

Figure 5B:
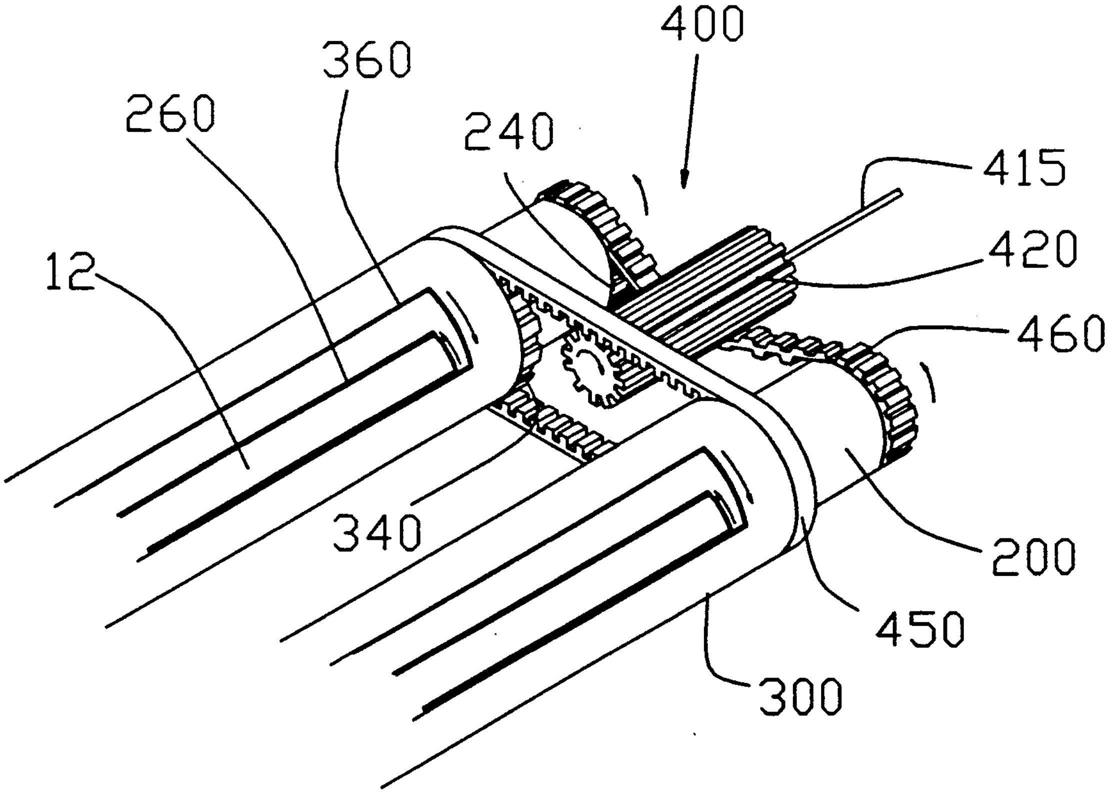

FIG. 5b shows how rotation means 400 could be used to rotate a pair of first hollow cylinders 200 axially in one direction and a pair of second hollow cylinders 300 axially in the opposite direction. Rotation means 400 comprises a motor (not shown) connected to shaft 415 which is connected to sprocketed gear drive 420. As with the three single cylinders 200 shown in FIGS. 4a and 5a, sprocketed endless conveyor 450 engages sprocketed gear drive 420. It also engages appropriate sprockets 340 of each second cylinder 300. A second sprocketed endless conveyor 460 having sprockets on both sides is used. Sprockets on one side of conveyor 460 engage appropriate sprockets 240 of each cylinder 200 and sprockets on the other side of conveyor 460 engage sprocketed gear drive 420. In this embodiment, conveyors 450 and 460 are sized to ensure proper rotational timing so that all cylinders 200 and all cylinders 300 rotate at the same number of revolutions per unit time. Openings 260 in all first cylinders 200 are in parallel, as are openings 360 in all second cylinders 300. This, along with the equal rotational speed of all cylinders 200 and 300 will ensure that radiation pulses 17 will simultaneously pass from each radiation source 12 through openings 260 and 360 and will always be directed to the same location with each rotation of cylinders 200 and 300.

In the alternative, instead of connecting a motor to shaft 415, a means to employ air turbine technology could be connected. Simply by connecting to shaft 415 a device having a plurality of fins and by having a compressed air source provide high speed air onto these fins, shaft 415 would rotate as above. Conveyors 450 and 460 would again act as timing belts to control rotation of the cylinders 200 and 300.

Figure 6A:
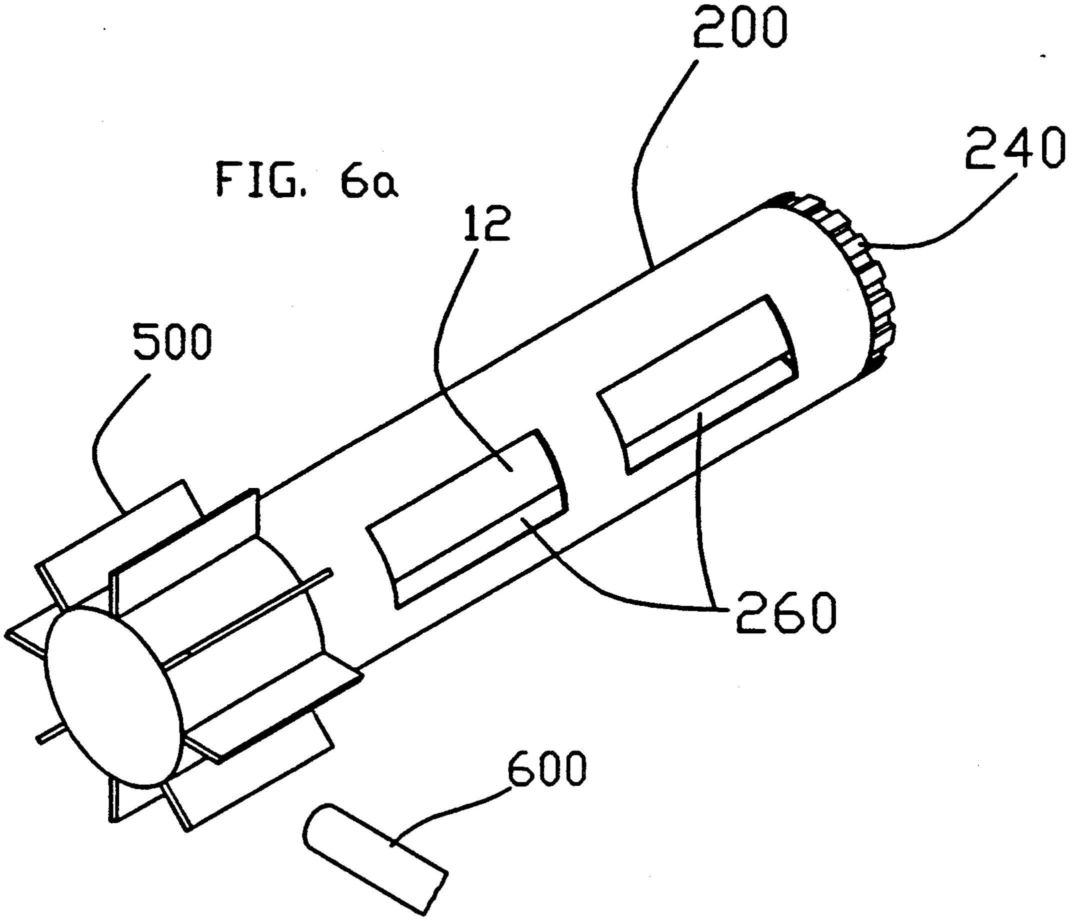
FIG. 6*a–b* shows alternative means to axially rotate cylinders using air turbine technology; and, FIG. 7 shows a more general embodiment of the present invention.
Figure 6B:
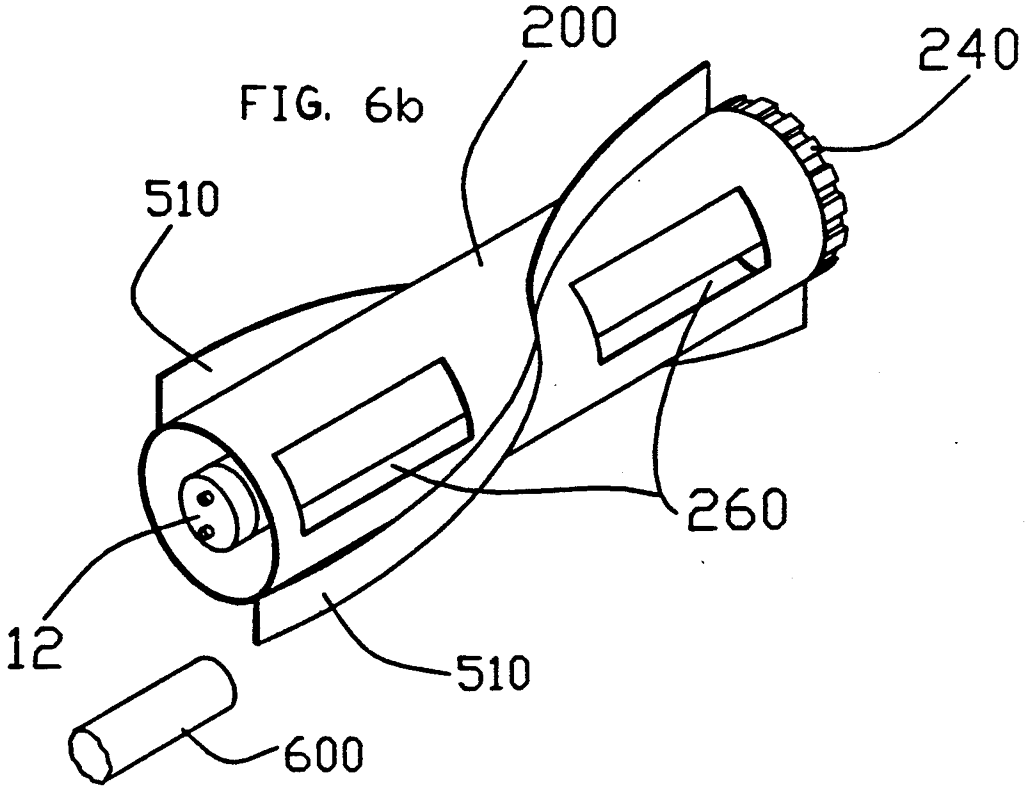
Figure 7:
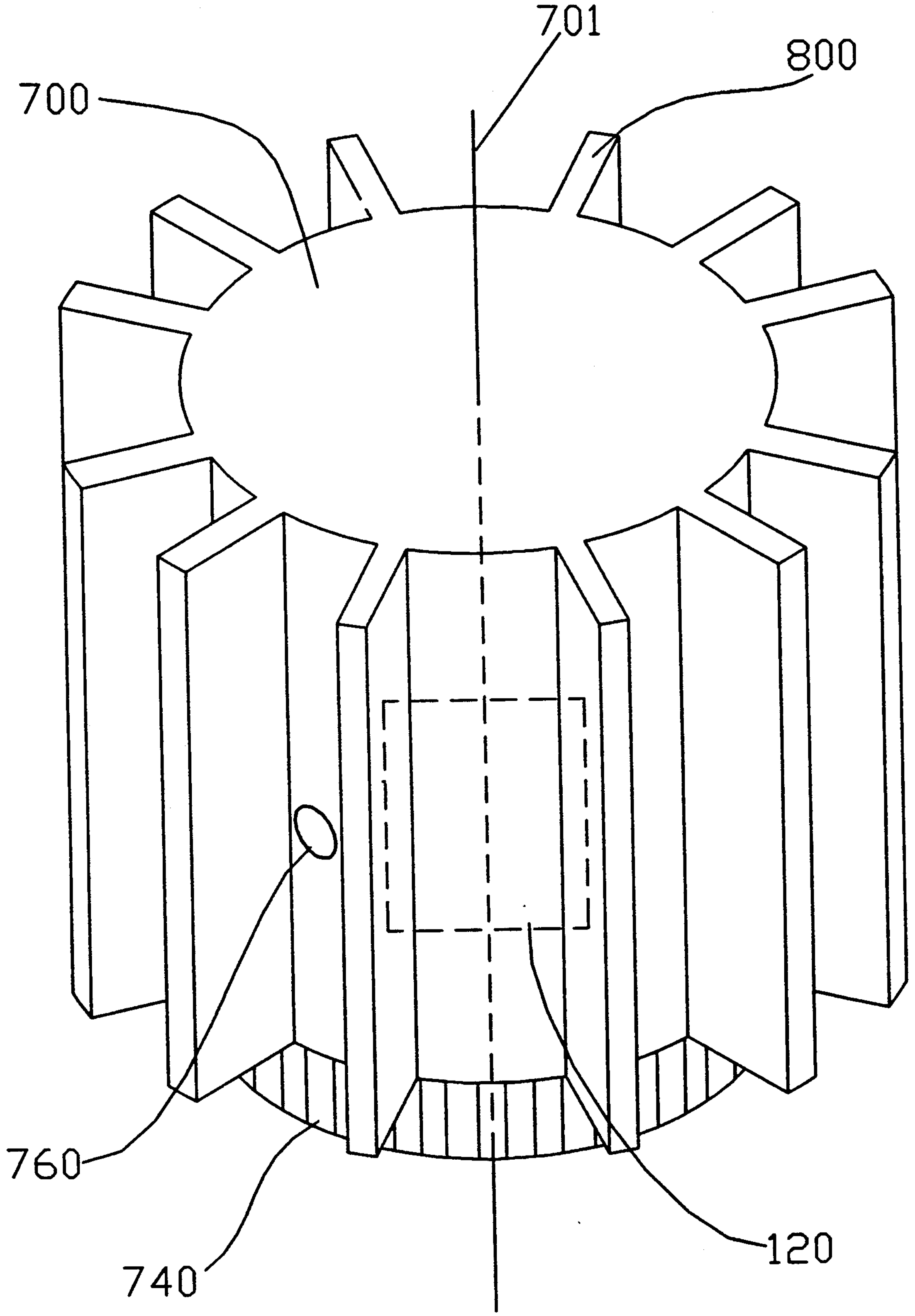

FIGS. 6a and 6b show alternatives to this which also employ air turbine technology. In FIG. 6a, fins 500 are added at the non-sprocketed end of cylinder 200 and compressed air is delivered onto fins 500 through nozzle 600 to rotate cylinder 200. Depending on the application, sprockets 240 can engage a conveyor, as previously described, to ensure that a plurality of cylinders will rotate with proper timing. FIG. 6b incorporates fins 510 which helically wrap around the outside surface of cylinder 200, positioned so as to not interfere with the radiation exiting openings 260. Placing cylinder 200 inside cylinder 300, as previously disclosed, and placing nozzle 600 so that air is blown between the outer surface of cylinder 200 and the inner surface of cylinder 300 will cause cylinder 200 to rotate. Again, sprockets 240 can be used to ensure proper timing if a plurality of cylinders is employed.

For applications involving a cylinder 200 coaxially aligned with cylinder 300, such as was described in FIG. 2, those skilled in the art can easily see how the fins 500 of FIG. 6a could be placed on both cylinders 200 and 300 and how air could be directed to have the cylinders 200 and 300 rotate in opposite directions. Also, for the fins 510 of FIG. 6b, the fins 510 of cylinder 200 and 510 of cylinder 300 would helix in opposite directions around the outside surface of their respective cylinders so that air would cause the cylinders to rotate in opposite directions. In this configuration, an outer sheath at least partway around the outside cylinder would be required to direct the air along the outside of this outside cylinder to cause it to rotate. The outside cylinder performs this "sheath" function for the inner cylinder.

FIG. 7 shows a more general embodiment of the present invention. As was previously mentioned, radiation sources will vary greatly in size and shape. This depends in part on the frequency of electromagnetic radiation produced, the power produced, and whether the radiation is pulsed of continuous. In FIG. 7, the radiation source 120 is depicted simply as a square. Radiation source 120 is surrounded by a partway closed three-dimensional geometric surface 700. Radiation from source 120 will not pass through surface 700. Surface 700 contains an opening 760 and has a defined axis of rotation, for example, axis 701, which does not intersect opening 760. Surface 700 is shown with sprockets 740 which can be used to rotate surface 700, as was disclosed with the previous embodiments. As shown, surface 700 is shaped having a plurality of radiation dissipation fins 800, which in a higher power embodiment will allow heat generated by radiation source 120 to be dissipated easier.

With one surface 700 being rotated, the previously described "lighthouse effect" radiation pattern will be produced. However, as was previously described surface 700 can be placed inside a second surface having a second opening therein, so that a more directed beam of radiation can be produced. This application would be particularly beneficial where pulses of radiation are to be directed toward one point. Either or both surfaces could be rotated, as was previously described. Also, as was previously described, pluralities of these single or double surfaces can be employed. Further, the rotation of the surfaces can be timed, for example, by employing conveyors, to produce simultaneous pulses of radiation.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A mechanical apparatus to ensure that only pulses of radiation are radiated in any specific direction, comprising:

a. a radiation source producing radiation;

b. a first partway closed three-dimensional geometric surface having thickness, said surface having a hollow portion inside its partway closed portion, said surface having at least one opening therethrough, said surface having an axis which does not intersect said at least one opening, said surface being shaped so that said radiation source can be placed inside said hollow portion inside said surface's partway closed portion, said surface being further shaped so that said radiation from said radiation source can pass from said hollow portion through said at least one opening through said surface, thereby forming a radiation beam; and c. means to axially rotate said first partway closed three-dimensional geometric surface at a rate of rotation sufficient so that said radiation beam is perceived by a human eye as continuous radiation.

2. The apparatus of claim 1, wherein said hollow portion has a surface which is reflective.

3. The apparatus of claim 1, wherein said hollow portion has a surface which is shaped to direct said radiation toward said at least one opening through said partway closed three-dimensional geometric surface.

4. The apparatus of claim 1, said means to axially rotate said first partway closed three-dimensional geometric surface including a motor.

5. The apparatus of claim 1, said means to axially rotate said first partway closed three-dimensional geometric surface including an air turbine means.

6. The apparatus of claim 1, wherein said first partway closed three-dimensional geometric surface has a hollow cylinder shape.

7. The apparatus of claim 1, wherein said radiation source is a slide projector bulb.

8. The apparatus of claim 1, wherein said radiation source is a visible light source for a translucent color photograph back lighting box.

9. The apparatus of claim 1, wherein said radiation source is selected from the group consisting of visible light radiator, ultraviolet light radiator, and ultraviolet c light radiator.

10. A mechanical apparatus to ensure that only pulses of radiation are radiated in any specific direction, comprising:

a. a plurality of radiation sources, each said radiation source producing radiation;

b. a plurality of first partway closed three-dimensional geometric surfaces having thickness, each said surface having a hollow portion inside its partway closed portion, each said surface having at least one opening therethrough, each said surface having an axis which does not intersect said at least one opening, each said surface being shaped so that one of plurality of radiation sources can be placed inside said hollow portion inside said surface's partway closed portion, each said surface being further shaped so that said radiation from said one of said plurality of said radiation source can pass from said hollow portion through said at least one opening through said surface, thereby producing a plurality of radiation beams, wherein said axes of said plurality of said first surfaces are parallel to each other; and, c. means to axially rotate each of said plurality of first partway closed three-dimensional geometric surfaces at a rate of rotation sufficient so that each of said plurality of radiation beams is perceived by a human eye as continuous radiation, wherein said means to rotate said plurality of first surfaces rotates each said surface at an identical rate of rotation.

11. The apparatus of claim 10, wherein each of said plurality of radiation sources is selected from the group consisting of visible light radiator, ultraviolet light radiator, and ultraviolet c light radiator.

* * * * *